United States Patent
Day et al.

(10) Patent No.: US 7,685,298 B2
(45) Date of Patent: Mar. 23, 2010

(54) SYSTEMS AND METHODS FOR PROVIDING AUTHENTICATION CREDENTIALS ACROSS APPLICATION ENVIRONMENTS

(75) Inventors: Jeff Day, Miami, FL (US); Roberto Valdes, Weston, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 91 days.

(21) Appl. No.: 11/565,929

(22) Filed: Dec. 1, 2006

(65) Prior Publication Data
US 2007/0130167 A1 Jun. 7, 2007

Related U.S. Application Data

(60) Provisional application No. 60/741,661, filed on Dec. 2, 2005.

(51) Int. Cl.
*G06F 15/16* (2006.01)
(52) U.S. Cl. .................................. 709/229; 709/227
(58) Field of Classification Search ................ 709/226, 709/227, 229
See application file for complete search history.

(56) References Cited

U.S. PATENT DOCUMENTS

| | | | |
|---|---|---|---|
| 5,301,270 A | 4/1994 | Steinberg et al. |
| 5,307,456 A | 4/1994 | MacKay |
| 5,329,619 A | 7/1994 | Page et al. |
| 5,418,964 A | 5/1995 | Conner et al. |
| 5,437,025 A | 7/1995 | Bale et al. |
| 5,442,791 A | 8/1995 | Wrabetz et al. |
| 5,475,819 A | 12/1995 | Miller et al. |
| 5,519,867 A | 5/1996 | Moeller et al. |
| 5,564,070 A | 10/1996 | Want et al. |
| 5,571,245 A | 11/1996 | Ooyabu et al. |
| 5,606,668 A | 2/1997 | Shwed et al. |
| 5,692,183 A | 11/1997 | Hapner et al. |
| 5,758,085 A | 5/1998 | Kouoheris et al. |
| 5,835,726 A | 11/1998 | Shwed et al. |
| 5,870,545 A | 2/1999 | Davis et al. |

(Continued)

FOREIGN PATENT DOCUMENTS

EP  1 431 896 A  6/2004

(Continued)

OTHER PUBLICATIONS

International Search Report by the ISA for PCT/US2006/061460, mailed on Jul. 8, 2008.

(Continued)

*Primary Examiner*—Larry Donaghue
*Assistant Examiner*—Brian J Gillis
(74) *Attorney, Agent, or Firm*—Choate, Hall & Stewart, LLP; John D. Lanza; Christopher J. McKenna (57) ABSTRACT

The present invention relates to a system for providing a modified URL from a proxy server to a virtualized computing environment attempting to access a remote resource. The modified URL may contain information which allows a proxy server which receives a request for the URL to generate a request for the remote resource where the request includes any state information necessary to access the resource. After transmitting the request, the proxy server may receive the requested resource; and transmit the resource to the application.

23 Claims, 5 Drawing Sheets

U.S. PATENT DOCUMENTS

| | | | |
|---|---|---|---|
| 5,877,766 A | 3/1999 | Bates et al. | |
| 5,889,816 A | 3/1999 | Agrawal et al. | |
| 5,909,559 A | 6/1999 | So | |
| 5,977,972 A | 11/1999 | Bates et al. | |
| 5,983,003 A | 11/1999 | Lection et al. | |
| 5,987,611 A | 11/1999 | Freund | |
| 6,006,090 A | 12/1999 | Coleman et al. | |
| 6,022,315 A | 2/2000 | Iliff | |
| 6,026,440 A | 2/2000 | Shrader et al. | |
| 6,072,490 A | 6/2000 | Bates et al. | |
| 6,098,158 A | 8/2000 | Lay et al. | |
| 6,101,543 A | 8/2000 | Alden et al. | |
| 6,105,067 A | 8/2000 | Batra | |
| 6,141,011 A | 10/2000 | Bodnar et al. | |
| 6,141,696 A | 10/2000 | Goertzel et al. | |
| 6,141,699 A | 10/2000 | Luzzi et al. | |
| 6,141,759 A | 10/2000 | Braddy | |
| 6,184,885 B1 | 2/2001 | DeStefano | |
| 6,185,601 B1 | 2/2001 | Wolff | |
| 6,206,829 B1 | 3/2001 | Iliff | |
| 6,209,088 B1 | 3/2001 | Reneris | |
| 6,232,970 B1 | 5/2001 | Bodnar et al. | |
| 6,233,606 B1 | 5/2001 | Dujari | |
| 6,243,753 B1 | 6/2001 | Machin et al. | |
| 6,272,556 B1 | 8/2001 | Gish | |
| 6,272,632 B1 | 8/2001 | Carman et al. | |
| 6,275,227 B1 | 8/2001 | DeStefano | |
| 6,275,942 B1 | 8/2001 | Bernhard et al. | |
| 6,289,382 B1 | 9/2001 | Bowman-Amuah | |
| 6,292,933 B1 | 9/2001 | Bahrs et al. | |
| 6,304,259 B1 | 10/2001 | DeStefano | |
| 6,304,893 B1 | 10/2001 | Gish | |
| 6,308,273 B1 | 10/2001 | Goertzel et al. | |
| 6,308,281 B1 | 10/2001 | Hall, Jr. et al. | |
| 6,310,634 B1 | 10/2001 | Bodnar et al. | |
| 6,317,777 B1 | 11/2001 | Skarbo et al. | |
| 6,321,337 B1 | 11/2001 | Reshef et al. | |
| 6,332,163 B1 | 12/2001 | Bowman-Amuah | |
| 6,334,149 B1 | 12/2001 | Davis, Jr. et al. | |
| 6,339,832 B1 | 1/2002 | Bowman-Amuah | |
| 6,340,977 B1 | 1/2002 | Lui et al. | |
| 6,345,239 B1 | 2/2002 | Bowman-Amuah | |
| 6,393,467 B1 | 5/2002 | Potvin et al. | |
| 6,397,253 B1 | 5/2002 | Quinlan et al. | |
| 6,404,446 B1 | 6/2002 | Bates et al. | |
| 6,421,738 B1 | 7/2002 | Ratan et al. | |
| 6,427,132 B1 | 7/2002 | Bowman-Amuah | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,438,600 B1 | 8/2002 | Greenfield et al. | |
| 6,442,549 B1 | 8/2002 | Schneider | |
| 6,446,109 B2 * | 9/2002 | Gupta | 709/203 |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,482,156 B2 | 11/2002 | Iliff | |
| 6,484,312 B1 | 11/2002 | Morrison | |
| 6,487,718 B1 | 11/2002 | Rodriguez et al. | |
| 6,496,850 B1 | 12/2002 | Bowman-Amuah | |
| 6,496,935 B1 | 12/2002 | Fink et al. | |
| 6,502,102 B1 | 12/2002 | Haswell et al. | |
| 6,502,213 B1 | 12/2002 | Bowman-Amuah | |
| 6,519,571 B1 | 2/2003 | Guheen et al. | |
| 6,523,027 B1 | 2/2003 | Underwood | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,546,425 B1 | 4/2003 | Hanson et al. | |
| 6,549,949 B1 | 4/2003 | Bowman-Amuah | |
| 6,550,057 B1 | 4/2003 | Bowman-Amuah | |
| 6,553,377 B1 | 4/2003 | Eschelbeck et al. | |
| 6,571,245 B2 | 5/2003 | Huang et al. | |
| 6,571,282 B1 | 5/2003 | Bowman-Amuah | |
| 6,578,068 B1 | 6/2003 | Bowman-Amuah | |
| 6,584,493 B1 | 6/2003 | Butler | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,660 B1 | 8/2003 | Bowman-Amuah | |
| 6,606,744 B1 | 8/2003 | Mikurak | |
| 6,609,128 B1 | 8/2003 | Underwood | |
| 6,611,867 B1 | 8/2003 | Bowman-Amuah | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,633,878 B1 | 10/2003 | Underwood | |
| 6,640,238 B1 | 10/2003 | Bowman-Amuah | |
| 6,640,244 B1 | 10/2003 | Bowman-Amuah | |
| 6,654,784 B1 | 11/2003 | Wei | |
| 6,658,625 B1 | 12/2003 | Allen | |
| 6,665,726 B1 | 12/2003 | Leighton et al. | |
| 6,671,818 B1 | 12/2003 | Mikurak | |
| 6,691,232 B1 | 2/2004 | Wood et al. | |
| 6,701,514 B1 | 3/2004 | Haswell et al. | |
| 6,704,873 B1 | 3/2004 | Underwood | |
| 6,715,145 B1 | 3/2004 | Bowman-Amuah | |
| 6,718,535 B1 | 4/2004 | Underwood | |
| 6,721,713 B1 | 4/2004 | Guheen et al. | |
| 6,742,015 B1 | 5/2004 | Bowman-Amuah | |
| 6,771,290 B1 | 8/2004 | Hoyle | |
| 6,789,252 B1 | 9/2004 | Burke et al. | |
| 6,816,904 B1 | 11/2004 | Ludwig et al. | |
| 6,816,963 B1 | 11/2004 | Krithivas et al. | |
| 6,820,267 B2 | 11/2004 | Christensen et al. | |
| 6,842,906 B1 | 1/2005 | Bowman-Amuah | |
| 6,849,045 B2 | 2/2005 | Iliff | |
| 6,850,252 B1 | 2/2005 | Hoffberg | |
| 6,853,391 B2 | 2/2005 | Bates et al. | |
| 6,871,346 B1 | 3/2005 | Kumbalimutt et al. | |
| 6,874,123 B1 | 3/2005 | DeStefano | |
| 6,891,953 B1 | 5/2005 | DeMello et al. | |
| 6,907,546 B1 | 6/2005 | Haswell et al. | |
| 6,912,571 B1 | 6/2005 | Serena | |
| 6,954,852 B2 | 10/2005 | Burokas et al. | |
| 6,957,186 B1 | 10/2005 | Guheen et al. | |
| 6,963,908 B1 | 11/2005 | Lynch et al. | |
| 6,968,364 B1 | 11/2005 | Wong et al. | |
| 6,970,849 B1 | 11/2005 | DeMello et al. | |
| 6,981,143 B2 | 12/2005 | Mullen et al. | |
| 6,990,480 B1 | 1/2006 | Burt | |
| 7,000,012 B2 | 2/2006 | Moore et al. | |
| 7,000,107 B2 | 2/2006 | Hewett et al. | |
| 7,003,777 B2 | 2/2006 | Hines | |
| 7,016,055 B2 | 3/2006 | Dodge et al. | |
| 7,023,979 B1 | 4/2006 | Wu et al. | |
| 7,036,128 B1 | 4/2006 | Julia et al. | |
| 7,047,411 B1 | 5/2006 | DeMello et al. | |
| 7,047,498 B2 | 5/2006 | Lui et al. | |
| 7,051,342 B2 | 5/2006 | Christensen et al. | |
| 7,062,645 B2 | 6/2006 | Kroening | |
| 7,072,807 B2 | 7/2006 | Brown et al. | |
| 7,076,736 B2 | 7/2006 | Hugh | |
| 7,093,020 B1 | 8/2006 | McCarty et al. | |
| 7,100,195 B1 | 8/2006 | Underwood | |
| 7,107,285 B2 | 9/2006 | von Kaenel et al. | |
| 7,117,504 B2 | 10/2006 | Smith et al. | |
| 7,124,101 B1 | 10/2006 | Mikurak | |
| 7,127,713 B2 | 10/2006 | Davis et al. | |
| 7,130,807 B1 | 10/2006 | Mikurak | |
| 7,136,645 B2 | 11/2006 | Hanson et al. | |
| 7,140,044 B2 | 11/2006 | Redlich et al. | |
| 7,143,153 B1 | 11/2006 | Black et al. | |
| 7,146,384 B2 | 12/2006 | Sawafta | |

| | | |
|---|---|---|
| 7,146,644 B2 | 12/2006 | Redlich et al. |
| 7,149,698 B2 | 12/2006 | Guheen et al. |
| 7,158,953 B1 | 1/2007 | DeMello et al. |
| 7,162,509 B2 | 1/2007 | Brown et al. |
| 7,165,041 B1 | 1/2007 | Guheen et al. |
| 7,167,899 B2 | 1/2007 | Lee et al. |
| 7,188,273 B2 | 3/2007 | Allen et al. |
| 7,191,252 B2 | 3/2007 | Redlich et al. |
| 7,194,761 B1 | 3/2007 | Champagne |
| 7,199,885 B2 | 4/2007 | Dodge et al. |
| 7,200,530 B2 | 4/2007 | Brown et al. |
| 7,203,941 B2 | 4/2007 | Demsey et al. |
| 7,206,805 B1 | 4/2007 | McLaughlin, Jr. |
| 7,206,819 B2 | 4/2007 | Schmidt |
| 7,212,296 B2 | 5/2007 | Dodge et al. |
| 7,213,247 B1 | 5/2007 | Wilner et al. |
| 7,218,779 B2 | 5/2007 | Dodge et al. |
| 7,310,721 B2 | 12/2007 | Cohen |
| 7,313,613 B1 | 12/2007 | Brooking et al. |
| 7,321,936 B2 | 1/2008 | Zimmerman et al. |
| 7,334,122 B2 | 2/2008 | Burokas et al. |
| 7,343,486 B1 | 3/2008 | McCarty et al. |
| 7,451,221 B2 | 11/2008 | Basani et al. |
| 2002/0032798 A1 | 3/2002 | Xu |
| 2002/0033844 A1 | 3/2002 | Levy et al. |
| 2002/0098840 A1 | 7/2002 | Hanson et al. |
| 2002/0104023 A1 | 8/2002 | Hewett et al. |
| 2002/0114004 A1 | 8/2002 | Ferlitsch |
| 2002/0122040 A1 | 9/2002 | Noyle |
| 2002/0133806 A1 | 9/2002 | Flanagan et al. |
| 2002/0161801 A1 | 10/2002 | Hind et al. |
| 2002/0194335 A1 | 12/2002 | Maynard |
| 2002/0199035 A1 | 12/2002 | Christensen et al. |
| 2003/0041167 A1 | 2/2003 | French et al. |
| 2003/0084165 A1 | 5/2003 | Kjellberg et al. |
| 2003/0093691 A1 | 5/2003 | Simon et al. |
| 2003/0120811 A1 | 6/2003 | Hanson et al. |
| 2003/0126266 A1 | 7/2003 | Peles |
| 2003/0154239 A1 | 8/2003 | Davis et al. |
| 2003/0177389 A1 | 9/2003 | Albert et al. |
| 2003/0182431 A1 | 9/2003 | Sturniolo et al. |
| 2003/0200290 A1 | 10/2003 | Zimmerman et al. |
| 2003/0208675 A1 | 11/2003 | Burokas et al. |
| 2003/0226038 A1 | 12/2003 | Raanan et al. |
| 2003/0229718 A1 | 12/2003 | Tock et al. |
| 2004/0073512 A1 | 4/2004 | Maung |
| 2004/0078591 A1 | 4/2004 | Teixeira et al. |
| 2004/0107360 A1 | 6/2004 | Herrmann et al. |
| 2004/0111519 A1 | 6/2004 | Fu et al. |
| 2004/0111642 A1 | 6/2004 | Peles |
| 2004/0128250 A1 | 7/2004 | Fox et al. |
| 2004/0268121 A1 | 12/2004 | Shelest et al. |
| 2004/0268357 A1 | 12/2004 | Joy et al. |
| 2004/0268358 A1 | 12/2004 | Darling et al. |
| 2005/0044089 A1 | 2/2005 | Wu et al. |
| 2005/0044108 A1 | 2/2005 | Shah et al. |
| 2005/0050053 A1 | 3/2005 | Thompson |
| 2005/0063083 A1 | 3/2005 | Dart et al. |
| 2005/0086670 A1 | 4/2005 | Christensen et al. |
| 2005/0091214 A1 | 4/2005 | Probert et al. |
| 2005/0091302 A1 | 4/2005 | Soin et al. |
| 2005/0091535 A1 | 4/2005 | Kavalam et al. |
| 2005/0091658 A1 | 4/2005 | Kavalam et al. |
| 2005/0097008 A1 | 5/2005 | Ehring et al. |
| 2005/0097298 A1 | 5/2005 | Cohen |
| 2005/0108328 A1 | 5/2005 | Berkeland et al. |
| 2005/0120091 A1* | 6/2005 | Casais et al. ............... 709/217 |
| 2005/0144481 A1 | 6/2005 | Hopen et al. |
| 2005/0149726 A1 | 7/2005 | Joshi et al. |
| 2005/0210150 A1 | 9/2005 | Bahl |
| 2005/0223114 A1 | 10/2005 | Hanson et al. |
| 2005/0223115 A1 | 10/2005 | Hanson et al. |
| 2005/0246635 A1 | 11/2005 | Hirose et al. |
| 2005/0265353 A1 | 12/2005 | Sengupta et al. |
| 2006/0041635 A1 | 2/2006 | Alexander et al. |
| 2006/0095689 A1 | 5/2006 | Peinado et al. |
| 2006/0117169 A1 | 6/2006 | Peinado et al. |
| 2006/0130124 A1 | 6/2006 | Richardson et al. |
| 2006/0167969 A1* | 7/2006 | Andreev et al. ............ 709/202 |
| 2006/0225130 A1 | 10/2006 | Chen et al. |
| 2006/0230105 A1 | 10/2006 | Shappir et al. |
| 2007/0006226 A1 | 1/2007 | Hendel |
| 2007/0245409 A1 | 10/2007 | Harris et al. |

FOREIGN PATENT DOCUMENTS

| | | |
|---|---|---|
| WO | WO-99/44121 | 9/1999 |
| WO | WO-2007/130274 A | 11/2007 |
| WO | WO-2008/045782 | 4/2008 |

OTHER PUBLICATIONS

Written Opinion by the ISA for PCT/US2006/061460, mailed on Jul. 8, 2008.
International Preliminary Report on Patentability for PCT/US2006/061460, mailed Jul. 8, 2008.
European Examination Report for EP Application No. 06846434.6 issued Oct. 1, 2008, 3 pages.
Second International Preliminary Report on Patentability for PCT/US2006/061460, issued on Jan. 20, 2009, 6 pages.

* cited by examiner

SYSTEMS AND METHODS FOR PROVIDING AUTHENTICATION CREDENTIALS ACROSS APPLICATION ENVIRONMENTS

RELATED APPLICATIONS

This application claims priority to U.S. provisional application Ser. No. 60/741,661 filed on Dec. 2, 2005 and titled METHODS AND SYSTEMS FOR PROVIDING AUTHENTICATION CREDENTIALS ACROSS APPLICATION ENVIRONMENTS.

FIELD OF THE INVENTION

The present invention relates to accessing remote resources on a network through a web proxy, and more specifically to providing access to a resource requested through a proxy server by a virtualized computing environment.

BACKGROUND OF THE INVENTION

In some environments, a request for a network resource must be accompanied by state information indicating the requester has access to the resource. For example, a server may require an authorization cookie to be present in a request for a given document. This state information is typically managed by a web browser.

However, there may be many cases where a user is navigating resources using a web page, and then selects a resource which requires an application other than the web browser to be viewed. In some cases, the web browser and the other application may be part of a virtualized computing environment. For example, a user may be navigating a web site and click on a link to a spreadsheet, causing the browser to launch a remotely hosted spreadsheet application for viewing the viewing. When the application hosted by a server is invoked for the purposes of loading the external HTTP-based resource, the application may be required to include state information for the request to be allowed. Some systems may lack a mechanism for injecting the necessary session state data into an upstream request. For example, in some systems, the link between the application and the external HTTP-based resource is provided directly by a file including connection information but lacking necessary session state data.

One result of lacking the necessary session state data may be presentation of a session failure message or error dialog box to a user of the system. Another result in cases where the application hosted on the application server supports rending of HTML (applications such as WORD, EXCEL, or POWERPOINT), may be the rendering of an error page within the application, such that the error page is presented as if it were the requested resource. This may cause confusion to the user.

Thus there exists a need for systems and methods which allow access of remote resources in launched applications while preserving state information necessary for the request.

SUMMARY OF THE INVENTION

The present invention relates to a system for providing a modified URL from a proxy server to an application attempting to access a remote resource. The modified URL may contain information which allows a proxy server which receives a request for the URL to generate a request for the remote resource where the request includes any state information necessary to access the resource. Providing the application with a URL pointing to this state information may enable seamless access to a protected resource without requiring a user of the system to enter credentials or be presented with errors.

In one aspect, the present invention is a method for providing access to a resource requested through a proxy server by a virtualized computing environment, wherein the resource is external to the virtualized computing environment's server system. In one embodiment, the method comprises: receiving a request from a client identifying an external resource; transmitting a first request for information corresponding to said external resource; receiving a first response to said first request, said first response comprising state information; transmitting to the client a file comprising a URL, said URL identifying said proxy and said external resource; receiving, from a virtualized computing environment, a request for said URL; transmitting a second request for said external resource, said request comprising said state information; receiving a second response to said second request; and transmitting information corresponding to said second response to said virtualized computing environment.

In a second aspect, the present invention is a computer system for providing access to a resource requested through a proxy server by a virtualized computing environment, wherein the resource is external to the virtualized computing environment's server system. In one embodiment, the system comprises: means for receiving a request from a client identifying an external resource; means for transmitting a first request for information corresponding to said external resource; means for receiving a first response to said first request, said first response comprising state information; means for transmitting to the client a file comprising a URL, said URL identifying said proxy and said external resource; means for receiving, from a virtualized computing environment, a request for said URL; means for transmitting a second request for said external resource, said request comprising said state information; means for receiving a second response to said second request; and means for transmitting information corresponding to said second response to said virtualized computing environment.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Figure 1:
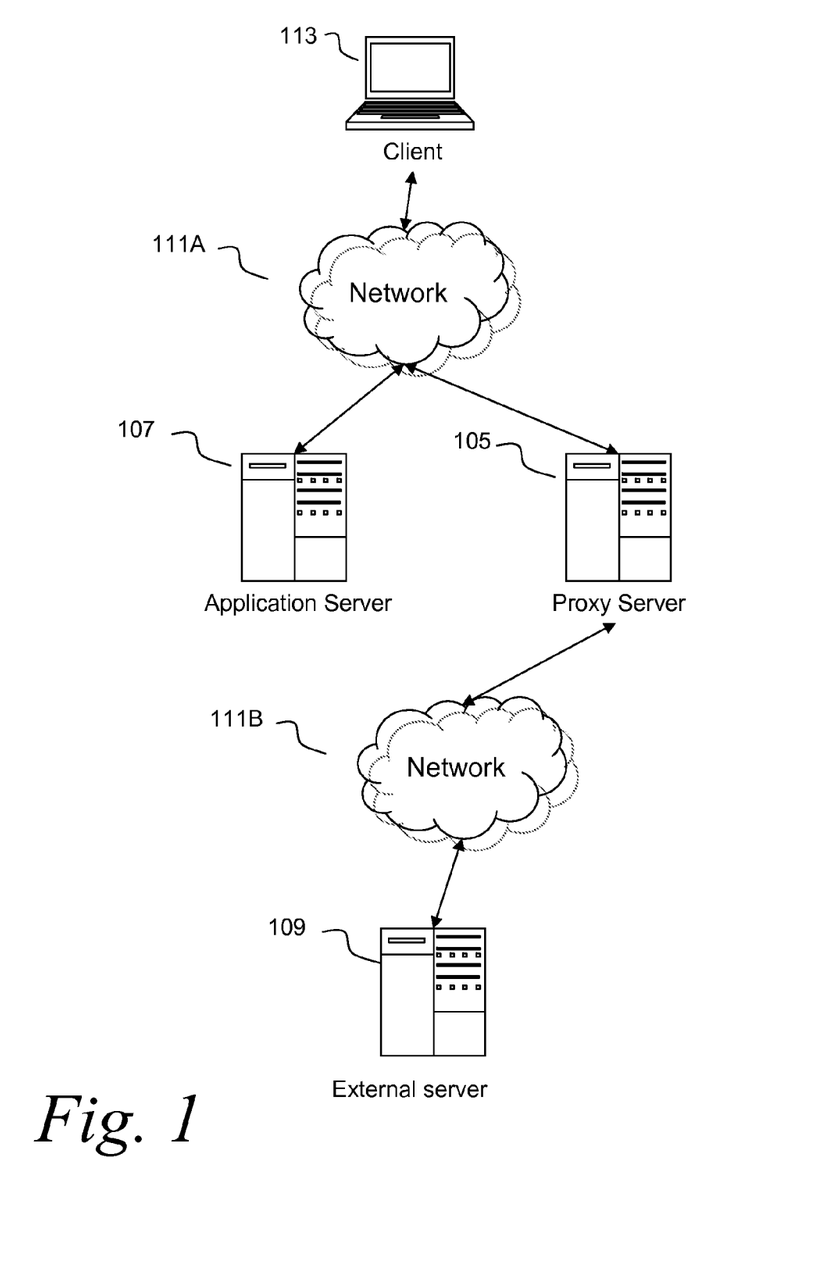
FIG. 1 is a block diagram depicting one embodiment of a computer network used to provide access to a computing environment and an external resource to a client.

Referring now to FIG. 1, one embodiment of a computer network is depicted. In brief overview, a client 113 is connected via a network 111A, to an application server 107 and a proxy server 105. The proxy server is also connected via a network 111B to an external server 109. The clients 113, networks 111A, 111B, and servers 105 may comprise any computing devices, including without limitation personal computers, notebook computers, personal digital assistants, cellular telephones, digital televisions, servers, and blades.

Still referring to FIG. 1 now in greater detail, in the embodiment shown, a client 113 is connected to a network 111A. The networks 111A and 111B (generally 111) may comprise the Internet, one or more local networks, one or more wide area networks, and/or one or more metropolitan area networks. The networks 111 may comprise any computing devices including web servers, file servers, routers, databases, computers, servers, and network appliances. The networks 111 may comprise computing devices connected via any means of connecting multiple computing devices including cables, IR ports, and wireless signals. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The networks 111 may comprise mobile telephone networks utilizing any protocol or protocols used to communicate among mobile devices, including AMPS, TDMA, CDMA, GSM, GPRS or UMTS. In some embodiments, the network 111A may be physically distinct from network 111B. In other embodiments, networks 111A and 111B may be connected via any manner, and via any topology. In some embodiments, networks 111A and 111B may comprise the same network. In some embodiments, the application server 107 or client 105 may also be connected to network 111B.

A client 113 may comprise any computing device. In some embodiments, the client may comprise a web browser. In some embodiments, the client 113 may comprise a client agent. In one of these embodiments, the client agent may support the Independent Computing Architecture (ICA) protocol, available from Citrix Systems, Inc. of Fort Lauderdale, Fla. In another of these embodiments, the client agent is an ICA client. In still another of these embodiments, the client agent supports the Remote Desktop Protocol (RDP), available from Microsoft Corporation. In yet another of these embodiments, the client agent is an RDP client. In still other embodiments, the client agent is an agent capable of communicating via a presentation layer protocol.

An application server may comprise any computing device capable of providing access to a computing environment to a client. For example, in one embodiment, an application server 107 may stream an application to the client 113. In another embodiment, an application server 107 may transmit application files that a client 113 downloads and executes. In still another embodiment, an application server may execute an application locally and transmit output to a client 113. In some embodiments, an application server 107 may be physically distinct from a proxy server 105. In other embodiments, an application server 107 may share any hardware or software with a proxy server 105.

In some embodiments, an application server may provide access to an application which comprises functionality for accessing resources via HTTP. Examples of applications that support the accessing of resources via HTTP include Microsoft OFFICE productivity applications such as MS WORD, MS EXCEL, MS POWERPOINT, and MS ACCESS, manufactured by Microsoft Corporation of Redmond, Wash. Examples of resources that may be accessed include MS WORD documents, MS EXCEL spreadsheets, MS POWERPOINT presentations, and MS ACCESS applications. In some embodiments, an application server may provide access to an application which comprises functionality for accessing Microsoft EXCHANGE resources.

A proxy server 105 may comprise any computing device capable of providing proxy services to a client. In some embodiments, a proxy server 105 may intercept requests from a client 113 for external resources, and forward the request to the external resources. In some embodiments, the proxy server 105 may modify any of the requests or responses that pass through the proxy server 105. For example, a proxy server may modify a request from a client for an external resource such that the request appears to originate from the proxy server 105. Or for example, a proxy server 105 may rewrite links in a response received from an external resource so that the links point to the proxy server 105.

In some embodiments, an network appliance may be used in conjunction with any of the servers shown in order to provide additional functionality. Examples of additional functionality provided by a network appliance may include, without limitation, firewall services, SSL pooling and acceleration, TCP pooling and acceleration, data compression, connection monitoring, application logging, application acceleration, application delivery, load balancing, caching, virtualization, translation, redirection, connection pooling, proxy services, reverse proxy services, authentication, and session management.

An external server 109 may comprise any server accessed by the client 113 through the proxy. An external server may provide functionality for transmitting any type of resource, including without limitation web pages, web applications, documents, spreadsheets, multimedia, and other files. Examples of external servers may include web servers operated by third parties, file servers, or remote databases. In some embodiments, an external server 109 may be operated by a third party. In some embodiments, an external server 109 may require a client 113 to complete a log-on process and a set a session cookie on a client browser before a resource may be accessed.

Figure 2A:
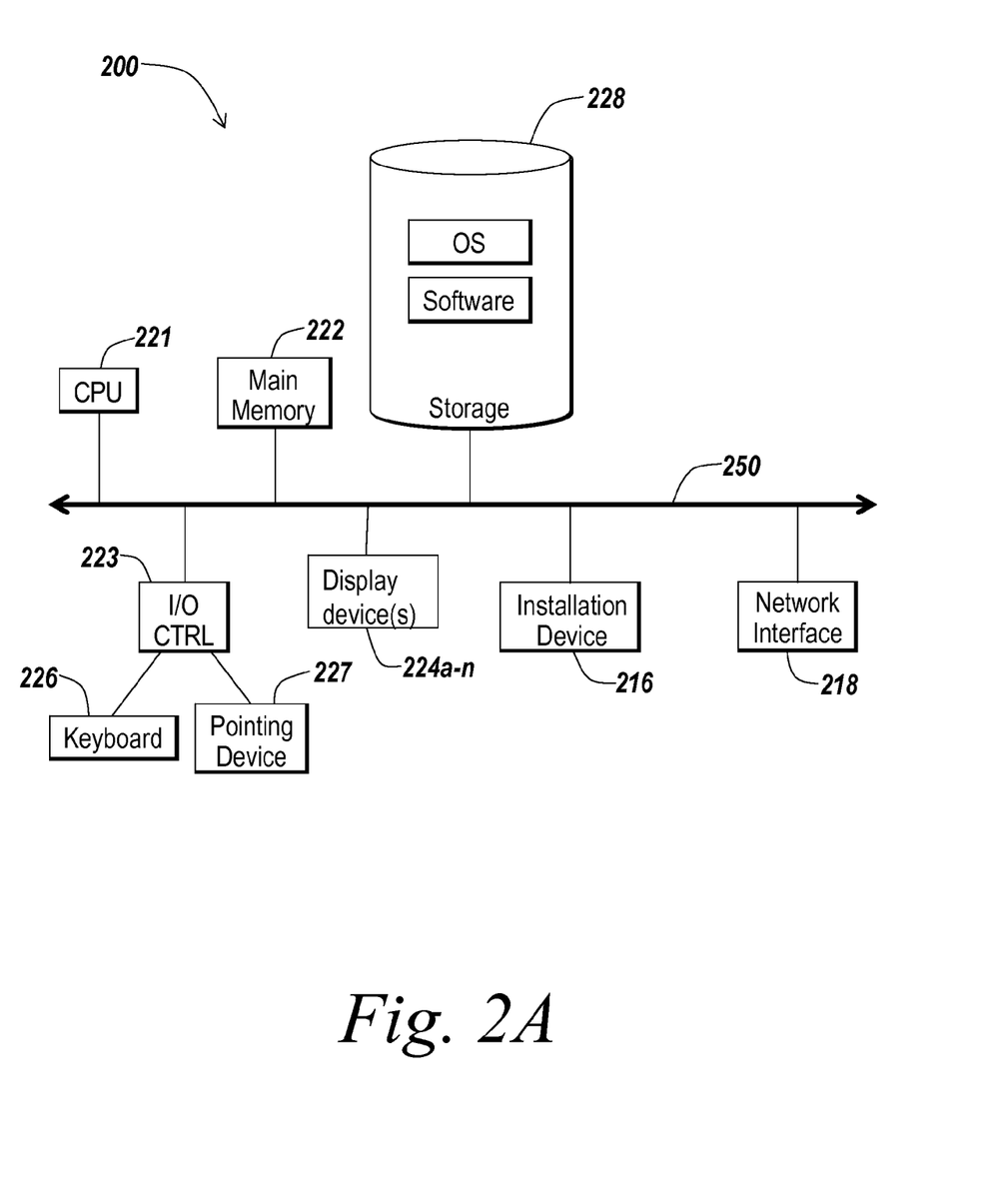
FIGS. 2A and 2B are block diagrams of embodiments of a computing or network device useful as a device in a client-server network.
Figure 2B:
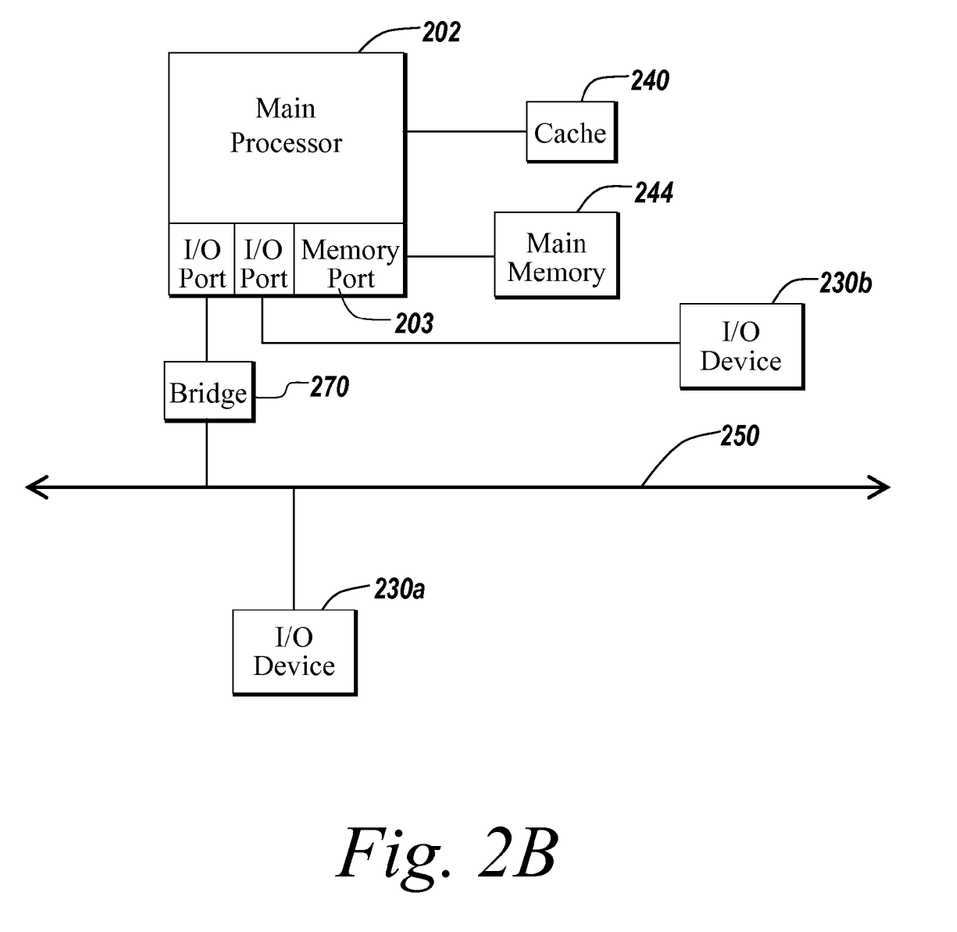

FIGS. 2A and 2B depict block diagrams of a typical computer 200 useful as client computing devices and server computing devices. As shown in FIGS. 2A and 2B, each computer 200 includes a central processing unit 202, and a main memory unit 204. Each computer 200 may also include other optional elements, such as one or more input/output devices 230a-230-b (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 250 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 250. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 250. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, cameras, video cameras, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 250 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 2A and 2B, including the processor 202 and the main memory 204.

Figure 3:
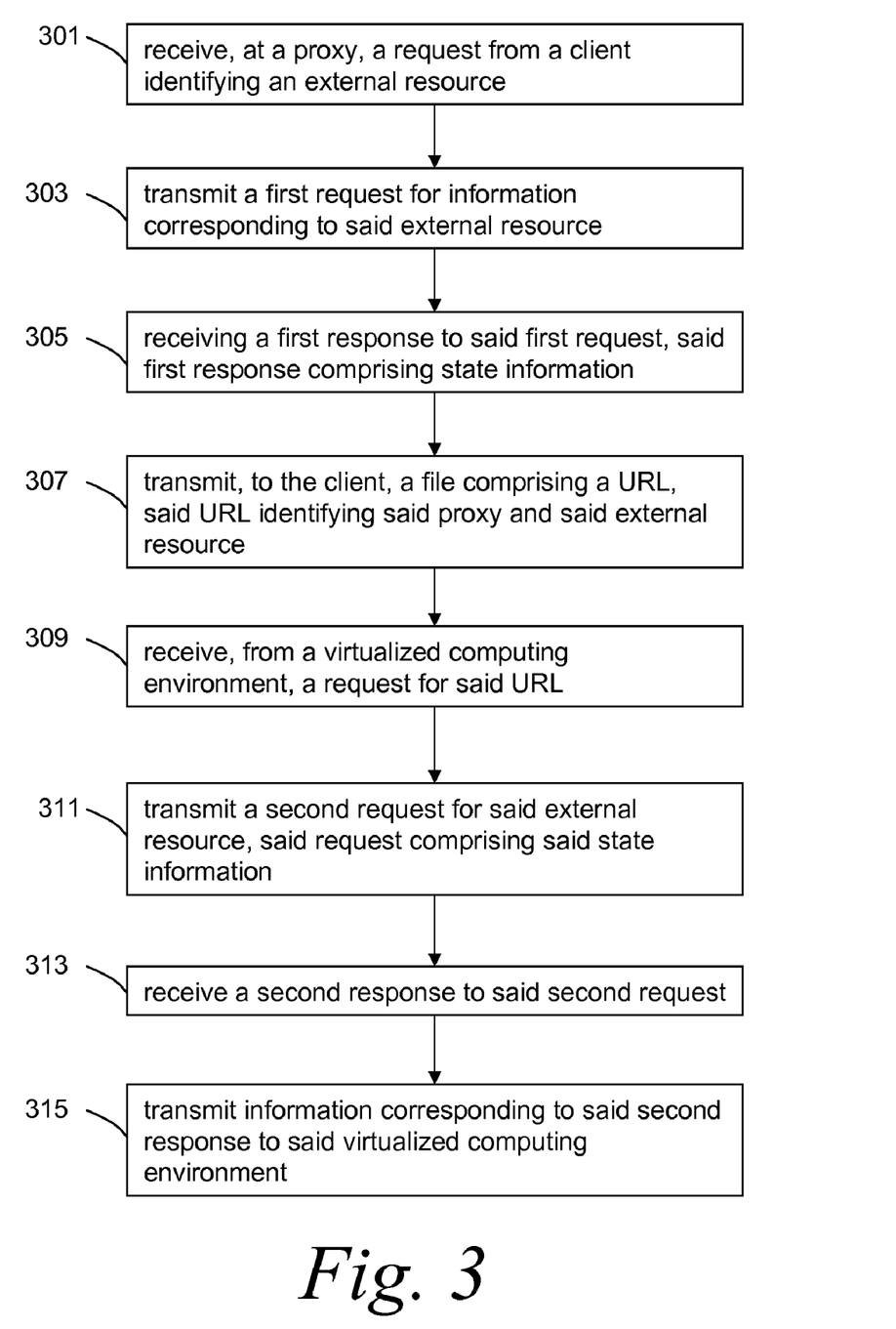
FIG. 3 is a block diagram depicting one embodiment of a method for providing seamless access to external resources accessed through an application server.

Referring now to FIG. 3, a block diagram depicting one embodiment of method for providing access to a resource requested through a proxy server by a virtualized computing environment, is shown. In brief overview, the method comprises: receiving a request from a client identifying an external resource (step 301); transmitting a first request for information corresponding to said external resource (step 303); receiving a first response to said first request, said first response comprising state information (step 305); transmitting to the client a file comprising a URL, said URL identifying said proxy and said external resource (step 307); receiving, from a virtualized computing environment, a request for said URL (step 309); transmitting a second request for said external resource, said request comprising said state information (step 311); receiving a second response to said second request (step 313); and transmitting information corresponding to said second response to said virtualized computing environment (step 315). Although the method will be described below in the context of being performed by a proxy server 105, the method may be performed by any computing device as described herein, including without limitation a proxy server 105, an application server 107, a network appliance, a client agent, or any combination thereof.

Still referring to FIG. 3, now in greater detail, a proxy server 105 may receive a request from a client 113 identifying an external resource (step 301). The request may be received via any protocol or protocols described herein. The external resource may comprise any resource residing on an external server. Examples of requests that may be received include, without limitation, requests for web pages, requests for documents, requests for files, and requests for web applications. In one embodiment, the request may be an HTTP request. In another embodiment, the request may be an FTP request. In some embodiments, the request may be accompanied by state information relating to the request. For example, an HTTP request may comprise a cookie relating to a web site from which the resource is requested. In another embodiment, the resource may comprise a remote desktop. For example, the proxy server may receive a request to open a file or application corresponding to a user's desktop on a remote machine. Or, for example, the proxy server may receive a request to open a web page which displays the contents of a remote desktop.

After receiving a request from a client 113 identifying an external resource (step 301), the proxy server 105 may then transmit a first request for information corresponding to said external resource (step 303). The first request may be transmitted using any protocol or protocols described herein, and may be transmitted to any external server 109 as described herein. In some embodiments, the request may be for MIME-type information corresponding to the external resource. For example, the proxy server 105 may send an HTTP HEAD request corresponding to the external resource.

After transmitting a first request for information corresponding to said external resource (step 303); the proxy server may receive a first response to said first request, said first response comprising state information (step 305). The first response may be received via any protocol or protocols described herein. In some embodiments, the first response may comprise an HTTP response. In some embodiments, the first response may comprise a MIME-type corresponding to the resource.

The state information may comprise any information corresponding to the client, the request, or the connection. In some embodiments, the state information may comprise a cookie. In other embodiments, the state information may comprise any information corresponding to the proxy's request or connection. For example, the state information may comprise a cookie comprising a session identifier corresponding to the client's interaction with an external server. Or, for example, the state information may comprise a user or machine identifier corresponding to the client. Or, for example, the state information may be a token or other identifier indicating that the client is permitted to access the resource.

In some embodiments, the proxy may store the received state information. The proxy may store the state information in any memory structure or element, including without limitation a database, file, or cache. In some embodiments, the proxy may store the state information indexed by client. In other embodiments, the proxy may store the state information indexed by the external resource. In still other embodiments, the proxy may store the state information in a memory structure associated with a given client connection.

After receiving a first response to said first request, said first response comprising state information (step 305); the proxy may transmit, to the client, a file comprising a URL, said URL identifying said proxy and said external resource (step 307). The file may comprise any file type capable of identifying the proxy and resource. In some embodiments, the file may comprise an ICA file. In still other embodiments, the file may comprise an RDP file. In some embodiments, the file may comprise information identifying the MIME-type of the external resource. In other embodiments, the file may comprise information identifying any other types or characteristics of the external resource, including without limitation file name, file extension, and file size.

In some embodiments, the URL points to a mechanism within the proxy server and to an embedded token that represents HTTP state for an external HTTP resource. In some embodiments, the URL contains an identifier which allows the proxy server, upon receiving a request for the URL, to retrieve data required to access the requested resource, such as session state data (for example, an HTTP cookie state) and authentication credentials.

In another embodiment, the modified URL, which may be referred to as a web proxy URL, points to both the web proxy and to the external web resource embedded inside the URL. In some embodiments, the modified URL has the form:

http://<servername>/<proxynamespace>/
    <base64hostname>/<path>/document.doc.

In these embodiments, <servername> may indicate a host where a web proxy is available, <proxynamespace> may be a token used to identify the web proxy namespace, and <base64hostname> may refer to a Base-64-encoded location of the external web resource, which may include a protocol and a hostname. In these embodiments <path> may refer to the root relative path to the external server.

In some embodiments, the file may comprise one or more instructions for an application to be opened with respect to the resource. For example, if the resource is a MICROSOFT WORD document, the file may comprise instructions to open MICROSOFT WORD. Or, for example, if the resource is a PDF document, the file may comprise instructions to open ADOBE ACROBAT. In other embodiments, the client may determine an application to open based on an identified type of the external resource.

In some embodiments, the file contains file type association information enabling an association between a type associated with a resource and an application capable of processing or providing access to the resource. In one of these embodiments, the ticket is referred to as an FTA ticket. In another of these embodiments, the FTA ticket includes additional information, such as http authentication and cookie state, needed to access to the external web resource. In some embodiments, the FTA ticket has a database table format such as the following:

```
CREATE TABLE [dbo].[FileTypeAssociation] (
    [ID] [uniqueidentifier] ROWGUIDCOL PRIMARY KEY
CLUSTERED NOT NULL ,
    [MasterSessionID] [uniqueidentifier] NOT NULL ,
    [ExpirationTime] [datetime] NOT NULL ,
    [Url] [varchar] (2048) NOT NULL ,
    [CookieData] [image] NULL ,
    [CookieDataHash] [binary] (20) NULL ,
    [Root] [varchar] (2048) NOT NULL ,
    [MessageID] [uniqueidentifier] NOT NULL ,
    [AttachID] [varchar] (10) NOT NULL ,
    [timestamp] [timestamp] NOT NULL
) ON [PRIMARY]
```

In this example, the MasterSessionID variable may store the session identifier for the session including the request and response. The ExpirationTime variable may store the session expiration time, or it may be used to indicate the cookie expiration time. The Url variable may store the URL of the requested resource. The CookieData variable may contain the state information corresponding to the session, and may comprise one or more HTTP cookies. The CookieDataHash variable may store a hash value of some or all of the cookie data, and may be computed using any hash algorithm, including cryptographic hashes such as SHA variants and MD variants. The Root variable may store the root URL or other identifier corresponding to the session. The MessageID variable may store one or more communications received by or sent from the proxy server. The AttachID variable may store an identifier corresponding to an ICA file sent to the client. The timestamp may store a timestamp corresponding to the time a transaction was executed by the proxy server, such as transmitting the ICA file to the client. In embodiments where the local machine includes a client agent, the client agent may be instantiated upon receipt of the file. In one of these embodiments, the client agent is provided with the location of the file inside a temporary cache on the web browser in the local machine.

After transmitting to the client a file comprising a URL, said URL identifying said proxy and said external resource (step 307); the proxy may receive, from a virtualized computing environment, a request for said URL (step 309). The request may comprise any protocol or protocols. In some embodiments, the request for the URL may comprise an HTTP request. In one embodiment, the request may be received from a virtualized computing environment executing on the client. In another embodiment, the request may be received from a virtualized computing environment executing on a server.

In some embodiments, the virtualized computing environment may comprise an application that is streamed from a server to a client. In other embodiments, the virtualized computing environment may comprise an application that executes on a server, which is in communication with a client via a presentation layer protocol, such as RDP or ICA. In still other embodiments, a virtualized computing environment may comprise a server providing access to an application, some or all of which has been downloaded by the client.

The URL may be specially formed to indicate to the proxy that the request is for the external resource. The URL may comprise any of the state information previously identified in connection with the external resource. The URL may also comprise an internal identifier which identifies to the proxy server that the request originates from a virtualized computing environment, and corresponds to the external resource.

In one embodiments, when the web proxy processes the URL, the web proxy determines whether an associated FTA ticket includes validation information and, if so, extracts the required state, and uses the state to allow the request to successfully be authorized on the external web server. In yet another of these embodiments, the web proxy re-injects the extracted state into the request for access to the resource. This results in authentication of the client machine enabling the client machine to access the web application.

The proxy server may then transmit a second request for said external resource, said request comprising said state information (step 311). This second request may comprise any protocol, including without limitation HTTP. In some embodiments, the second request may comprise an HTTP GET request identifying the external resource. In some embodiments, the second request may comprise one or more cookies containing the state information.

The proxy server may then receive a second response to said second request (step 313). In some embodiments, the second response may comprise some or all of the requested resource. In some embodiments, the second response may comprise an HTTP response.

The proxy server may then transmit information corresponding to said second response to said virtualized computing environment (step 315). The information may comprise some or all of the external resource. In some embodiments, a transmittal from the proxy server to the virtualized computing environment may be compressed, accelerated, and/or filtered for security purposes. In one embodiments, the compression, acceleration, and/or filtering may be performed by a network appliance.

Figure 4:
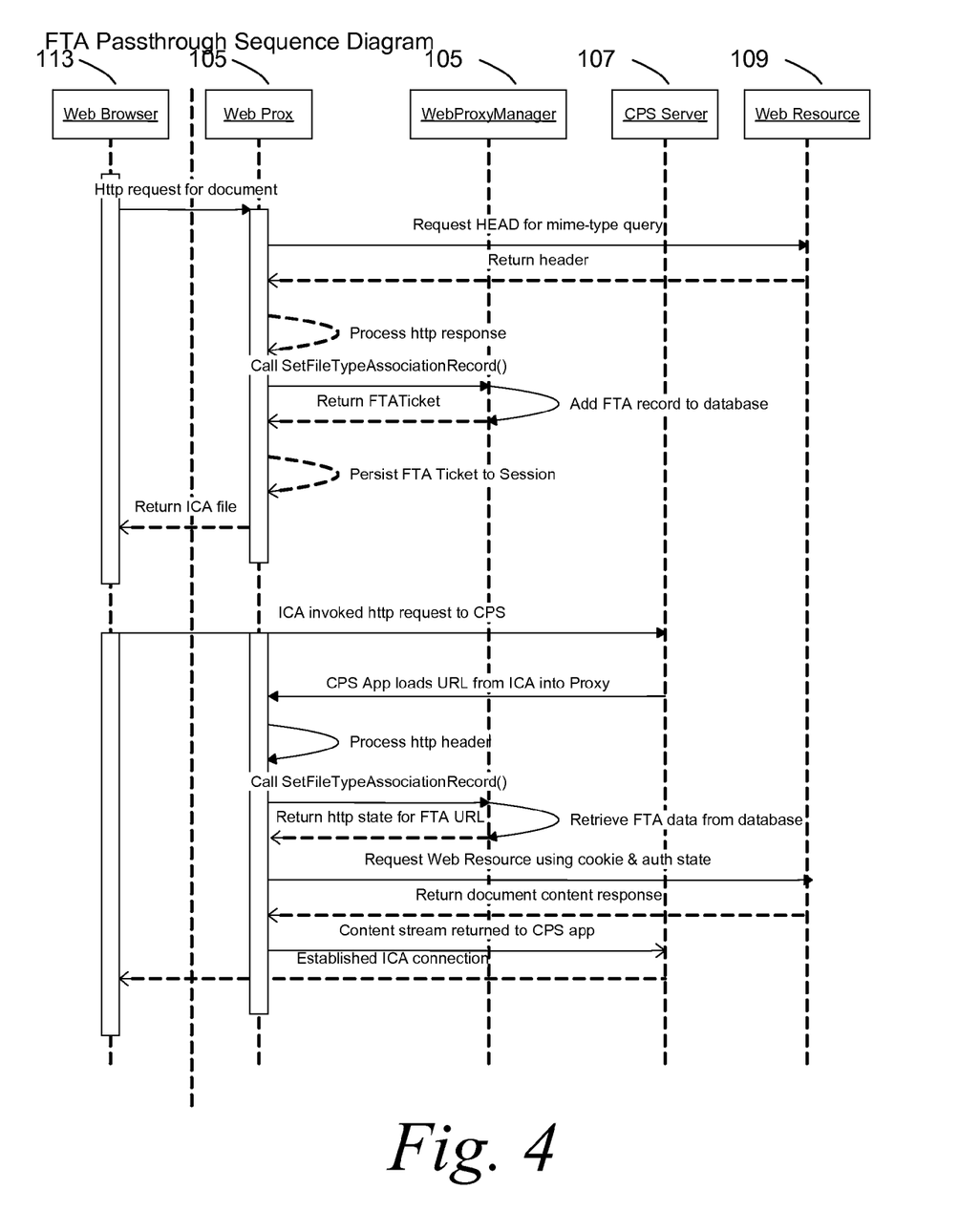
FIG. 4 is a flow diagram depicting one example of providing seamless access to external resources accessed through an application server.

Referring now to FIG. 4, a flow diagram depicting one example of providing seamless access to external resources accessed through an application server is shown. In brief overview, after providing the required log-on information and session date, a client receives access to a resource on the external web resource by the following steps.

1. An end user makes a request by selecting a link in a web browser. The link points to a web proxy through which a word processing document on an external web resource may be accessed.
2. The web proxy processes the request and identifies a location of the external web resource to which the proxied request should be sent via HTTP.
3. The external web resource locates the requested word processing document and returns an HTTP header response downstream to the Web Proxy.
4. The Web Proxy receives the response and identifies a type associated with the word processing document, such as a MIME type. The Web Proxy records the incoming URL HTTP state including all cookies and http authentication state used to access the URL. The state is persisted to a database and the Web Proxy receives a ticket. Web Proxy provides the ticket and a raw URL to an activation service. A file, such as an ICA file, is generated with the LongCommandName parameter pointing to a URL that goes through web proxy, points to the web resource and contains the http context ticket. The file is sent downstream to the web browser. In some embodiments, the URL may be of the form:

http://hostname/CitrixWebProxy/<base64hostname>/path/document.doc

5. The web browser activates the client agent based on the returned file mime-type and points to the file from a temporary location inside the browser cache. The client agent connects to the application server.
6. The application server invokes the application associated with the file type, which may be a hooked word processing file format. The hosted application (MS WORD, in this case) uses the LongCommandName parameter, which then attempts to open the raw URL pointing to the external web resource through the web proxy.
7. The web proxy identifies the request and its http context ticket, and retrieves the stored authentication state and cookie state from the database. The authentication state and cookie state are re-injected into the upstream request sent to the resource.
8. The external web resource receives the incoming request and attempts to identify a session cookie in the incoming request and confirms that the request is authorized. The external web resource sends the word processing document downstream back to the Web Proxy
9. The Web Proxy receives the downstream response and proxies the response to the hosted application (MS WORD in this example).

In one embodiment, the initial request from the web browser on the local machine to download the external web resource for activation begins when a user of the local machine selects a link in the web browser. In some embodiments, the present invention utilizes two established connections from the local machine to the servers. In one of these embodiments, the first connection may be an HTTP request sent from a web browser on the local machine that is pointed to the web proxy. In another of these embodiments, the second connection may be a connection, such as an ICA or other presentation layer protocol connection, between the client agent on the local machine and the application server. Once the second connection has been made, an application hosted by the application server uses the web proxy to provide HTTP authentication and cookie state to the external web resource, allowing the resource to be accessed.

While the invention has been particularly shown and described with reference to specific preferred embodiments, it should be understood by those skilled in the art that various changes in form and detail may be made therein departing from the spirit and scope of the invention as defined by the appended claims.

We claim:

1. A method for providing access to a resource requested through a proxy server by a virtualized computing environment, wherein the resource is external to a virtualized computing environment's server, said method comprising:
   (a) receiving, by a proxy service configured on an intermediary device, a request from a client identifying a document of an application on a server;
   (b) transmitting, by the proxy service, a first request for information corresponding to said server;
   (c) receiving, by the proxy service from said server, a first response to said first request, said first response comprising state information;
   (d) identifying, by the proxy service, a type of the document based on the first response;
   (e) transmitting, by the proxy service, to the client a file comprising a uniform resource locator (URL), said URL identifying the intermediary device and said server, the file comprises an HTTP context ticket corresponding to HTTP authentication state and cookie state for accessing the document;
   (f) receiving, by the proxy service, from a virtualized computing environment executing on the client, a request for said URL, the virtualized computing environment activated based on the type of the document;
   (g) transmitting, by the proxy service, a second request for said server, said second request comprising said state information from said first response;
   (h) receiving, by the proxy service, a second response to said second request; and
   (i) transmitting, by the proxy service, information corresponding to said second response to said virtualized computing environment.

2. The method of claim 1, further comprising the step of storing said state information.

3. The method of claim 1, wherein step (b) comprises transmitting a first hypertext transfer protocol (HTTP) request for information corresponding to said server.

4. The method of claim 1, wherein step (c) comprises receiving a first HTTP response to said first request, said first response comprising state information.

5. The method of claim 4, wherein step (c) comprises receiving a first HTTP response to said first request, said first response comprising information corresponding to a multipurpose internet mail extension (MIME) type corresponding to said server.

6. The method of claim 4, wherein step (c) comprises receiving a first HTTP response to said first request, said first response comprising an HTTP cookie.

7. The method of claim 6 wherein step (f) comprises transmitting a second request for said server, said second request comprising state information comprising an HTTP cookie.

8. The method of claim 1, wherein step (d) comprises transmitting to the client, via a presentation-layer protocol, a file comprising a URL, said URL identifying said intermediary device and said server.

9. The method of claim 8, wherein step (d) comprises transmitting, to the client, via independent computing architecture protocol (ICA), a file comprising a URL, said URL identifying said intermediary device and said server.

10. The method of claim 8, wherein step (d) comprises transmitting, to the client, via remote desktop protocol (RDP), a file comprising a URL, said URL identifying said intermediary device and said server.

11. The method of claim 1, wherein step (h) comprises transmitting, via an ICA connection, information corresponding to said second response to said virtualized computing environment.

12. A system for providing access to a resource requested through a proxy server by a virtualized computing environment, wherein the resource is external to a virtualized computing environment's server, said system comprising:
   means for receiving, by a proxy service configured on an intermediary device, a request from a client identifying a document of an application on a server;
   means for transmitting, by the proxy service, a first request for information corresponding to said server;
   means for receiving, by the proxy service from said server, a first response to said first request, said first response comprising state information;
   means for identifying, by the proxy service, a type of document of the application based on the first response received from said server;
   means for transmitting, by the proxy service, to the client a file comprising a uniform resource locator (URL), said URL identifying the intermediary device and said server, the file comprises an HTTP context ticket corresponding to HTTP authentication state and cookie state for accessing the document;
   means for receiving, by the proxy service, from a virtualized computing environment executing on the client, a request for said URL, said virtualized computing environment activated based on the type of the document;
   means for transmitting, by the proxy service, a second request for said external resource, said request comprising said state information from said first response;
   means for receiving, by the proxy service, a second response to said second request; and
   means for transmitting, by the proxy service, information corresponding to said second response to said virtualized computing environment.

13. The system of claim 12, further comprising means for storing said state information.

14. The system of claim 12, wherein said means for transmitting a first request comprise means for transmitting a first hypertext transfer protocol (HTTP) request for information corresponding to said server.

15. The system of claim 12, wherein said means for receiving a first response comprise means for receiving a first HTTP response to said first request, said first response comprising state information.

16. The system of claim 15, wherein said means for receiving a first response comprise means for receiving information corresponding to a multipurpose internet mail extension (MIME) type corresponding to said server.

17. The system of claim 15, wherein said means for receiving a first response comprise means for receiving a response comprising an HTTP cookie.

18. The system of claim 17, wherein said means for transmitting a second request comprise means for transmitting a second request for said server, said request comprising state information comprising an HTTP cookie.

19. The system of claim 12, wherein said means for transmitting to the client a file comprise means for transmitting to the client, via a presentation-layer protocol, a file comprising a URL, said URL identifying said intermediary device and said server.

20. The system of claim 19, wherein said means for transmitting to the client a file comprise means for transmitting, to the client, via independent computing architecture protocol (ICA), a file comprising a URL, said URL identifying said intermediary device and said server.

21. The system of claim 19, wherein said means for transmitting to the client a file comprise means for transmitting, to the client, via remote desktop protocol (RDP), a file comprising a URL, said URL identifying said intermediary device and said server.

22. The system of claim 12, wherein said means for transmitting information corresponding to said second response comprise means for transmitting, via an ICA connection, information corresponding to said second response to said virtualized computing environment.

23. A method for providing access to a resource requested through a proxy server by a client agent of a client, said method comprising:

(a) transmitting, by a proxy service configured on an intermediary device, to a server, a first request for information corresponding to the server, the first request transmitted responsive to a request received from a client identifying a document of an application on the server;

(b) identifying, by the proxy service, a type of the document of the application based on a first response received from the server, said first response comprising state information;

(c) transmitting, by the proxy service, to the client a file comprising a uniform resource locator (URL) that identifies said intermediary device and said server and comprises an HTTP context ticket corresponding to HTTP authentication state and cookie state for accessing the document of the application;

(d) receiving, by the proxy service, from a client agent executing on the client, a request for said URL, said client agent activated based on the type of the document of the application;

(e) retrieving, by the proxy service, the HTTP authentication state and cookie state based on identifying, by the proxy service, the HTTP context ticket from the received request for said URL;

(f) transmitting, by the proxy service, a second request for said server, said second request comprising the retrieved HTTP authentication state and cookie state; and (g) transmitting, by the proxy service, the document of the application to said client responsive to receiving a second response to said second request, the second response comprising the document of the application.

* * * * *